(12) United States Patent
Phillips et al.

(10) Patent No.: US 6,913,429 B1
(45) Date of Patent: Jul. 5, 2005

(54) TOOLESS BIT RETAINING ASSEMBLY

(75) Inventors: Alan Phillips, Jackson, TN (US); John W. Schnell, Jackson, TN (US); John M. Beville, Jackson, TN (US)

(73) Assignee: Porter-Cable Corporation, Jackson, TN (US)

( * ) Notice: Subject to any disclaimer, the term of this patent is extended or adjusted under 35 U.S.C. 154(b) by 123 days.

(21) Appl. No.: 10/632,562

(22) Filed: Jul. 31, 2003

Related U.S. Application Data

(60) Provisional application No. 60/400,245, filed on Jul. 31, 2002.

(51) Int. Cl.$^7$ .......................... B23C 1/20; B23B 31/169
(52) U.S. Cl. ................. 409/182; 409/232; 144/136.95; 279/42; 279/48
(58) Field of Search ................................ 409/181–182, 409/232, 234; 144/136.95, 154.5; 408/240, 408/239 R; 279/42–43, 48, 50, 56–57, 61–62, 279/74, 75, 82, 134–135

(56) References Cited

U.S. PATENT DOCUMENTS

| | | | | |
|---|---|---|---|---|
| 1,835,194 A | * | 12/1931 | Whiton ....................... | 279/119 |
| 2,311,258 A | * | 2/1943 | Sjogren ....................... | 279/53 |
| 2,326,322 A | * | 8/1943 | Bell ............................. | 279/53 |
| 3,499,657 A | * | 3/1970 | Giraud et al. ................ | 279/114 |
| 4,167,062 A | * | 9/1979 | Page et al. .................... | 279/50 |
| 4,260,169 A | * | 4/1981 | Hall ............................. | 279/62 |
| 4,275,893 A | * | 6/1981 | Bilanceri ...................... | 279/75 |
| 4,305,597 A | * | 12/1981 | McCarty ....................... | 279/59 |
| 4,663,203 A | * | 5/1987 | Coffin, Sr. ................... | 279/66 |

(Continued)

FOREIGN PATENT DOCUMENTS

JP    2-131805 A    *    5/1990

(Continued)

OTHER PUBLICATIONS

Wrenchless Router Collet; http://www.plasticsmag.com/ta.asp?aid = 1858; Jul. 10, 2003.

(Continued)

*Primary Examiner*—Erica Cadugan
(74) *Attorney, Agent, or Firm*—Suiter West PC LLO

(57) ABSTRACT

A bit retaining assembly for retaining a bit in a rotary tool, in particular a router such as a hand-held router, a table-mounted router, a pocket cutter, a laminate trimmer, a rotary cutout tool, or the like employs a planetary gear system for multiplying the torque applied to clamp the bit within a collet. The bit retaining assembly comprises a chuck for coupling the bit retaining assembly to the rotor shaft of the rotary tool. A collet is disposed in the chuck for receiving the bit. A nut threaded onto the chuck compresses the collet about the bit to secure the bit within the collet. A planetary gear system transmits torque applied to a housing member to the nut for rotating the nut on the chuck. Preferably, the planetary gear system multiplies the torque transmitted to the nut so that the torque transmitted to the nut is greater than the torque applied to the housing member.

48 Claims, 10 Drawing Sheets

U.S. PATENT DOCUMENTS

| | | | | |
|---|---|---|---|---|
| 4,718,682 A | * | 1/1988 | Zilic et al. | 279/116 |
| 4,758,006 A | * | 7/1988 | Hiestand | 279/135 |
| 5,143,686 A | * | 9/1992 | Shimizu | 279/110 |
| 5,215,507 A | * | 6/1993 | Bonig | 279/33 |
| 6,079,916 A | * | 6/2000 | Grayson et al. | 409/182 |
| 2004/0222600 A1 | * | 11/2004 | Jacobs et al. | 279/48 |

FOREIGN PATENT DOCUMENTS

WO     WO 03/064090 A1     1/2003

OTHER PUBLICATIONS

The New Tool Gang; Handy; Sep./Oct. 2003; p. 34.

* cited by examiner

US 6,913,429 B1

TOOLESS BIT RETAINING ASSEMBLY

CROSS-REFERENCE TO RELATED APPLICATIONS

The present application claims the benefit under 35 U.S.C. § 119(e) of U.S. Provisional Application Ser. No. 60/400,245 filed Jul. 31, 2002. Said U.S. Provisional Application Ser. No. 60/400,245 is herein incorporated by reference in its entirety.

FIELD OF THE INVENTION

The present invention generally relates to the field of powered tools employing interchangeable bits, and particularly, routers including, but not limited to, hand-held routers, table-mounted routers, pocket cutters, laminate trimmers, rotary cutout tools, and the like. The present invention is more specifically related to a bit retaining assembly which allows insertion and removal of a bit without the use of tools.

BACKGROUND OF THE INVENTION

When changing the bit of a router, it is necessary to use hand tools such as wrenches, or the like, in order to provide adequate mechanical advantage to safely tighten or loosen the bit within a router collet. For instance, most routers require the use of a first wrench to lock a router drive shaft from rotation while a second wrench is used to loosen a bit attached to the drive shaft. However, it is often desirable to quickly attach a bit to a drive shaft or to quickly remove the bit from the drive shaft during one operation employing the router. For example, several router bits may be needed throughout the course of shaping a single work piece with a hand-held router, and it may be desirable to change between the bits quickly and efficiently. The use of one or more wrenches or like tools for changing between the bits is inefficient and thus undesirable in such applications, because of the additional time and effort required for attaching and removing the bits to and from the drive shaft via the wrenches.

Additionally, because the collet which receives the router bit is usually recessed within a shield or shroud, or surrounded by an assembly such as a router table or the like, it may be very difficult to reach the collet and the drive shaft with the appropriate tools for changing the bit. Another problem may arise when a router bit must be secured to a drive shaft at a remote location. The absence of a wrench or some other suitable device may effectively prevent the removal or replacement of the bit from the drive shaft.

SUMMARY OF THE INVENTION

Accordingly, the present invention is directed to a bit retaining assembly for retaining a bit in a rotary tool, in particular a router such as a hand-held router, a table-mounted router, a pocket cutter, a laminate trimmer, a rotary cutout tool, or the like. The bit retaining assembly employs a planetary gear system for multiplying the torque applied to clamp the bit within the collet. In one embodiment, the bit retaining assembly comprises a chuck for coupling the bit retaining assembly to the rotor shaft of the rotary tool. A collet is disposed in the chuck for receiving the bit. A nut threaded onto the chuck compresses the collet about the bit to secure the bit within the collet. A planetary gear system transmits torque applied to a housing member to the nut for rotating the nut on the chuck. Preferably, the planetary gear system multiplies the torque transmitted to the nut so that the torque transmitted to the nut is greater than the torque applied to the housing member.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
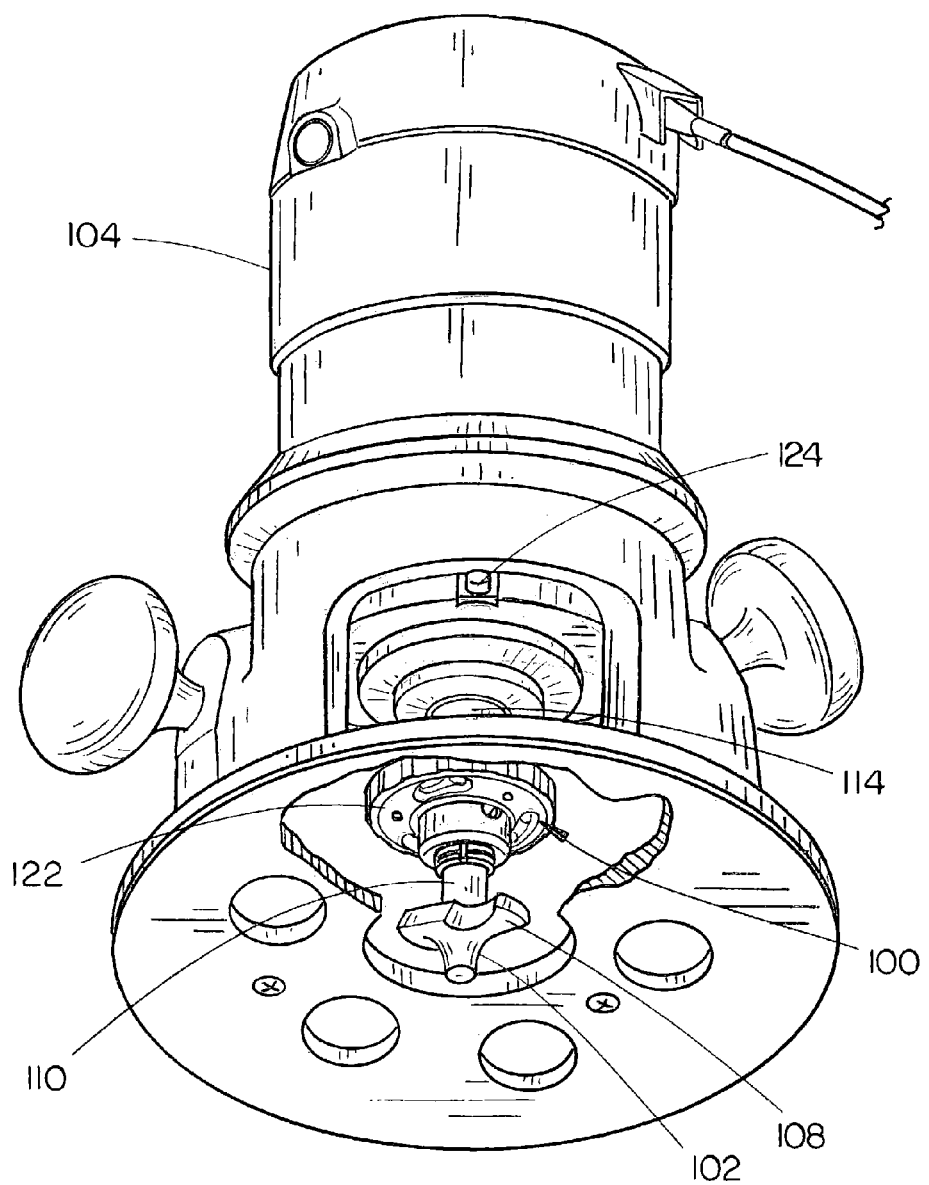
FIG. 1 is an isometric view illustrating a router, in particular, a hand-held router employing a bit retention assembly in accordance with an exemplary embodiment of the present invention.
Figure 2:
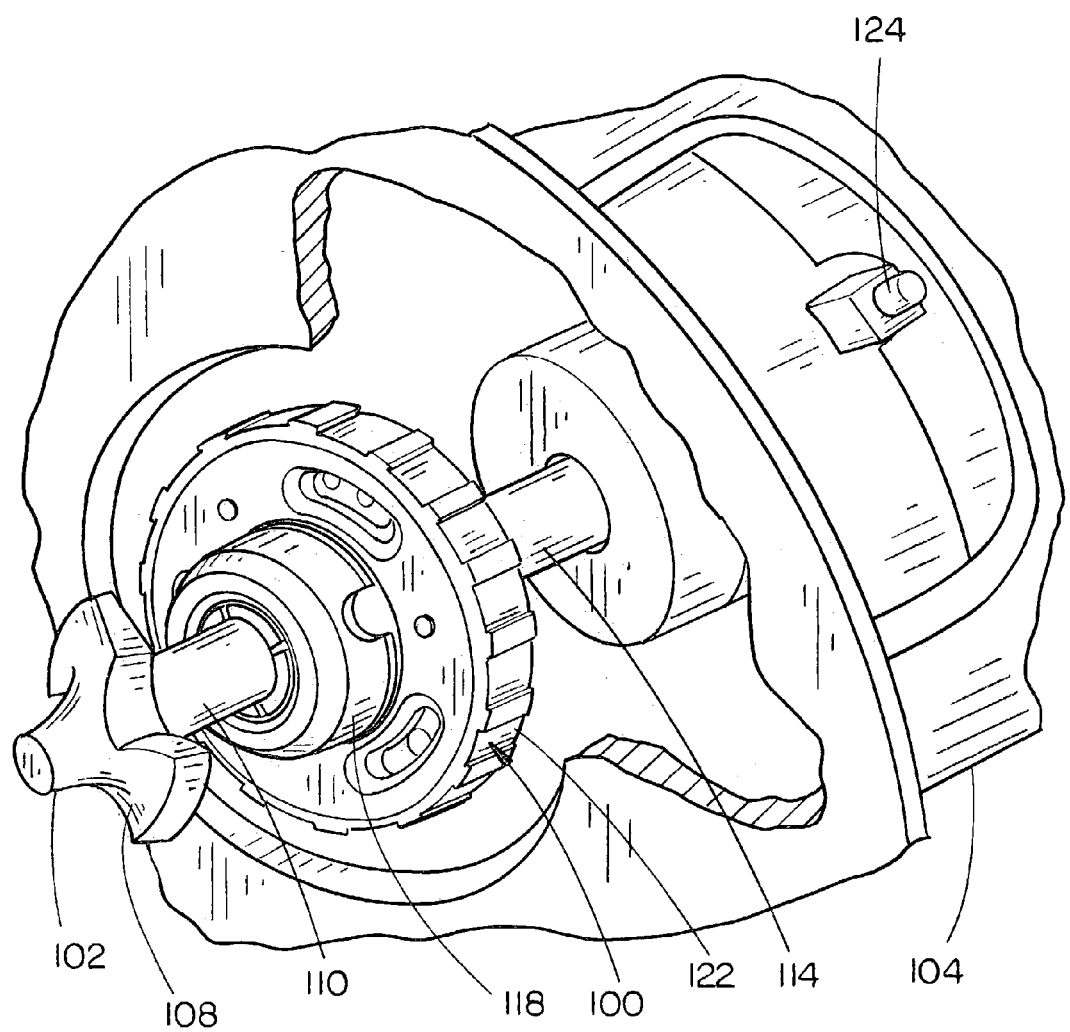
FIG. 2 is an isometric view further illustrating the bit retention assembly shown in FIG. 1.

Referring generally to FIG. 1, a bit retaining assembly 100 in accordance with an exemplary embodiment of the present invention is shown. The bit retaining assembly 100 allows a bit 102 to be retained in the collet of a rotary tool, in particular a router such as a hand-held router 104, a table-mounted router, a pocket cutter, a laminate trimmer, a rotary cutout tool, or the like, without the use of hand tools such as wrenches, or the like, which are typically required by prior art bit holding devices in order to provide the additional mechanical advantage needed to securely clamp the collet about the bit. The bit retaining assembly 100 of the present invention employs a planetary gear system 106 for multiplying the torque applied to clamp the bit 102 within the collet of the bit retaining assembly 100. Preferably, the bit retaining assembly 100 is suitable for use with bits commonly used in rotary tools such as routers or the like. Such bits typically include a cutting head for shaping a material of a work piece and a shank that is clamped within the collet of the bit retaining assembly of the rotary tool. In the embodiments illustrated herein, a router bit 102 having a cutting head 108 and shank 110 is shown that is exemplary of the types of bits that may be used with the bit retaining assembly 100 of the present invention. It will be appreciated by those of skill in the art that the cutting head 108 and shank 110 shown are thus also exemplary, and that bits suitable for use by the present invention may employ a wide variety of cutting heads and shank designs depending of the shaping operation or cut to be performed by the rotary tool.

Referring now to FIGS. 1 through 7, an exemplary bit retaining assembly 100 in accordance with the present invention is described. The bit retaining assembly 100 includes a chuck 112 for coupling the bit retaining assembly 100 to the rotor shaft 114 of the rotary tool (hand-held router 104). A collet 116 is held within a generally conical depression formed in the chuck 112 for receiving the bit 102. A nut 118, threaded onto the chuck 112, alternately compresses the collet 116 to secure the bit 102 within the collet 116 and releases the collet allowing it to unclamp and release the bit 102 depending on the position of the nut 118 on the chuck 112. As shown, the collet 116, which has the general shape of a truncated cone, comprises a plurality of axial fingers 120 (four are illustrated) compressed by the chuck 112 about the bit 102. The planetary gear system 106 transmits torque applied to a housing member (i.e., ring gear 122) to the nut 118 for rotating the nut 118 on the chuck 112. The planetary gear system 106 multiplies the torque transmitted to the nut 118 so that the torque transmitted to the nut 118 is greater than the torque applied to the ring gear 122. In a preferred embodiment of the present invention, the hand-held router 104 includes a spring loaded locking pin 124 that engages a hole formed in the rotor shaft 114 and locks the rotor shaft 114 as the ring gear 122 is rotated by the user. The locking pin 124 is depressed by the user, engaging the pin with the rotor shaft 114, to prevent rotation of the rotor shaft 114 while the ring gear 122 is rotated for tightening or loosening the nut 118, thereby clamping or releasing the bit 102 within the bit retaining assembly 100.

As shown in FIGS. 2 through 7, the collet 116 of the bit retaining assembly 100 is compressed between the chuck 112 and the nut 118. The nut 118 is threaded to the chuck 112 for compressing the collet 116 and retaining the bit 102. The chuck 112 is fixedly connected to a rotor shaft 114 (e.g., threaded onto the rotor shaft 114 (shown), held to the rotor shaft by a pin, etc.) for rotating the bit 102 retained by the collet 116. The nut 118 is rotated by an output gear member 126. In the embodiment illustrated in FIGS. 2 through 7, the output gear member 126 includes a plurality of projections 134 that are slidably received in slots formed in the nut 118 thereby interlocking the output gear member 126 and the nut 118 together. In this manner, rotation of the output gear member 126 causes corresponding rotation of the nut 118 through the interaction of the projection 134 with the nut 118. The output gear member 126 includes output gear member teeth 128 circumferentially located about an inner edge 130 of its outer rim 132. The chuck 112 also includes chuck gear teeth 136 circumferentially located about an inner edge 138 of its outer rim 140, so that the chuck gear teeth 136 are adjacent to the output gear member teeth 128.

A plurality of planet gear assemblies 142 (three are shown), each having large and small planet gears 144 and 146, respectively, orbit within the ring gear 122. The ring gear 122, which is concentrically located about the nut 118, includes ring gear teeth 148 circumferentially located about its inner edge 150. Preferably, an outer surface 152 of the ring gear 122 is shaped to provide a gripping surface for rotating the ring gear 122. For example, in the embodiment illustrated in FIGS. 2 through 7, the outer surface 152 may include ridges 154 which allow the ring gear 122 to be more easily gripped by the user. First and second carriers 156 and 158, respectively, couple the ring gear 122 to the chuck 122 and hold the planet gear assemblies 142 between the ring gear 122, chuck 112 and output gear member 126. In the exemplary embodiment shown in FIGS. 2 through 7, the first carrier 156 and the second carrier 158 include a plurality of kidney shaped protrusions 162 and 164 which are connected via suitable fasteners (e.g., rivet 160) rivet 160 fastened between first protrusions 162 firmed in the first carrier 156 and corresponding second protrusions 164 formed in the second carrier 158.

Figure 3:
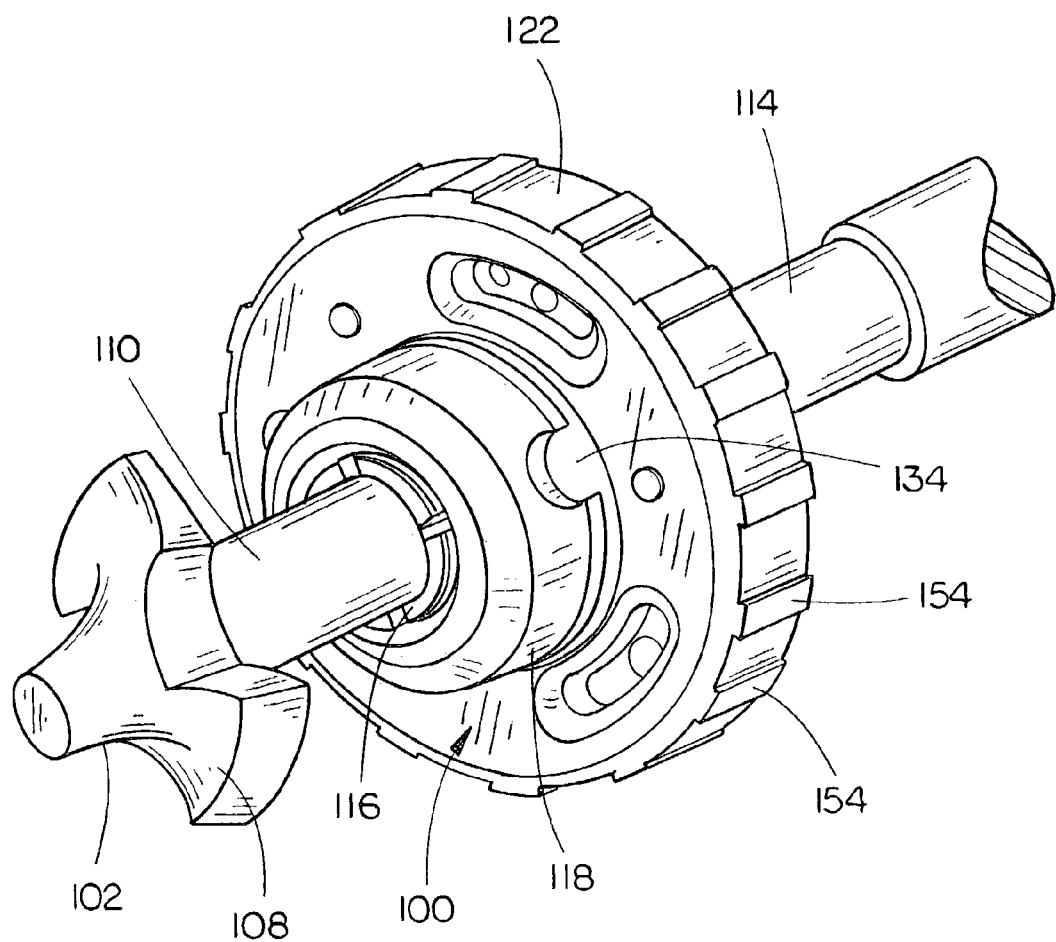
FIG. 3 is an isometric view further illustrating the bit retention assembly shown in FIG. 1.
Figure 4:
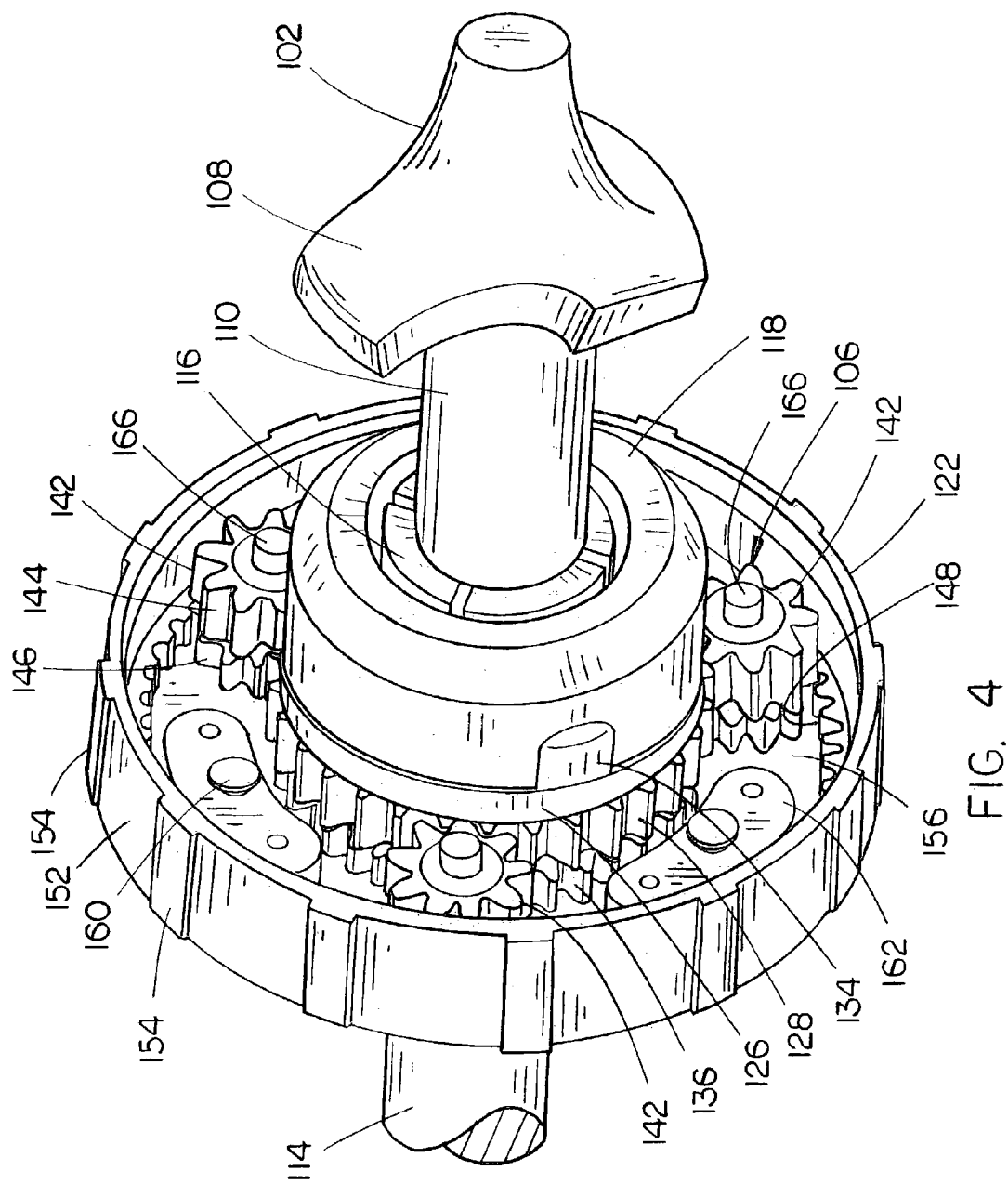
FIG. 4 is a partially exploded isometric view of the bit retention assembly shown in FIG. 1.
Figure 5:
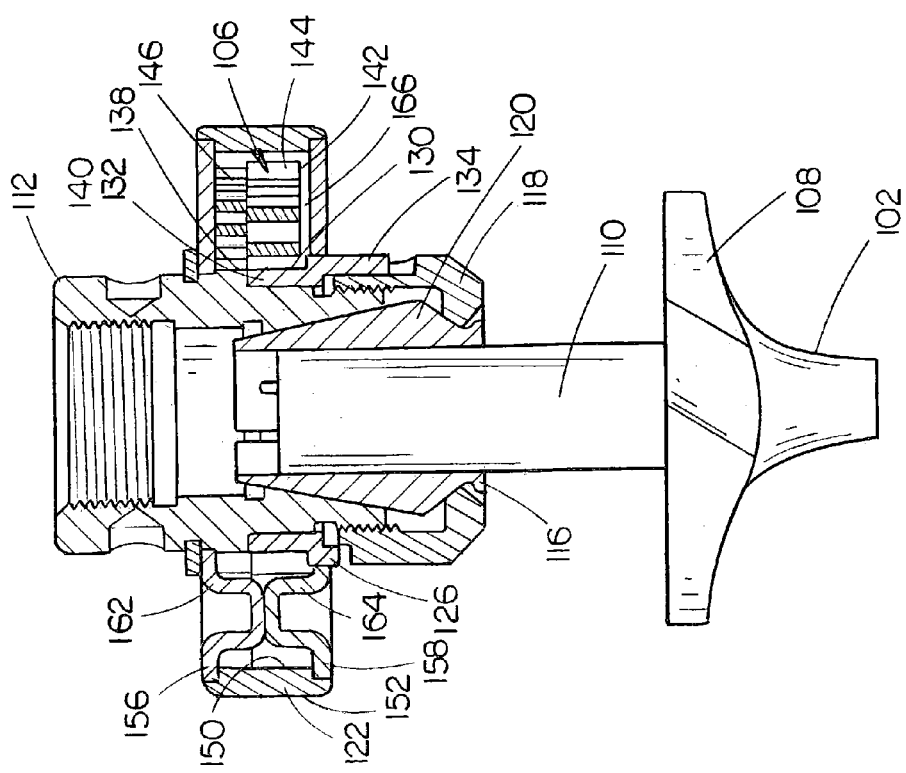
FIG. 5 is a cross-sectional side elevation view of the bit retention assembly shown in FIG. 1, wherein the bit retention assembly is closed for holding a bit.
Figure 7:
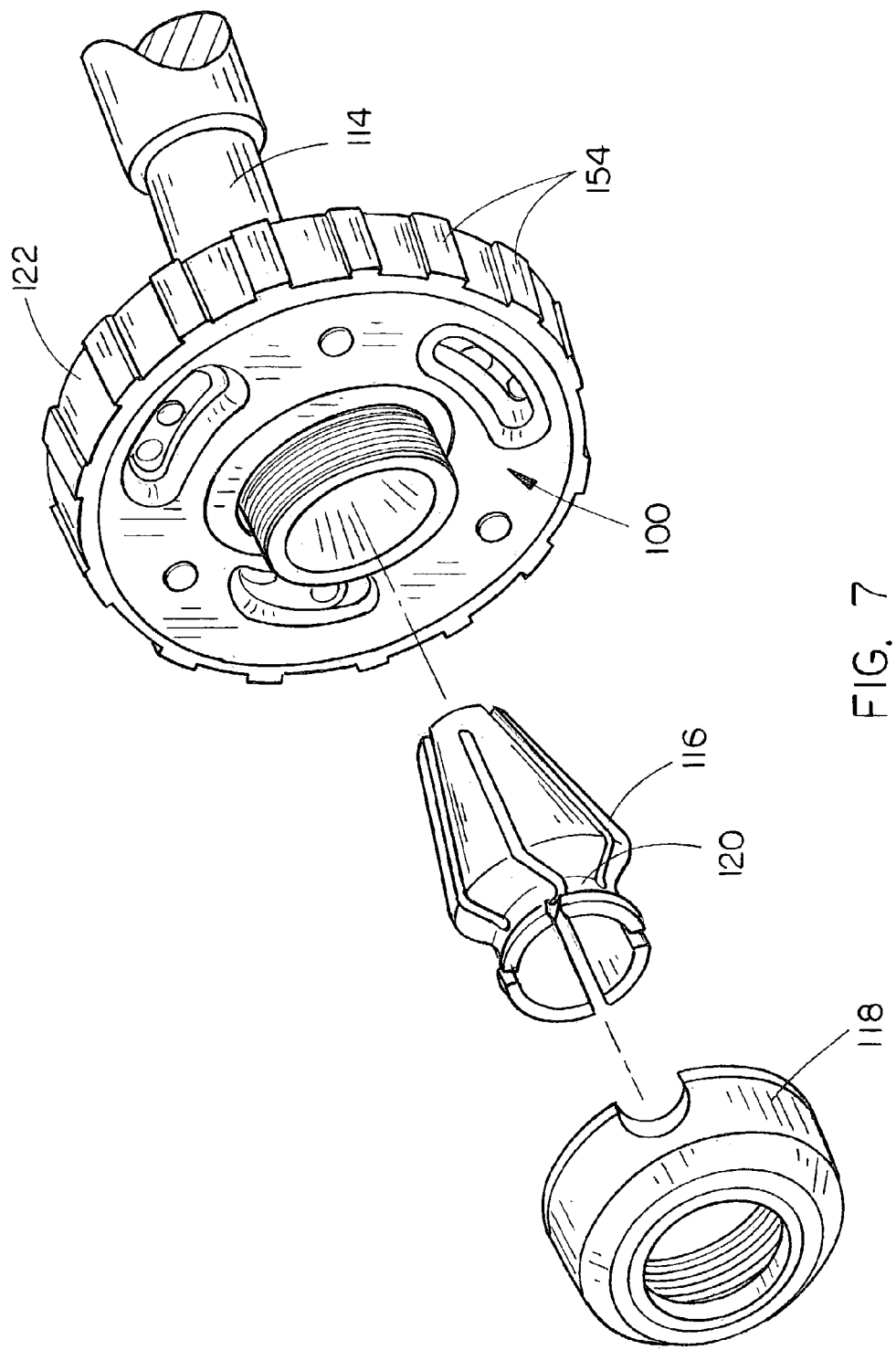
FIG. 7 is an isometric view illustrating a collet assembly suitable for use with the bit retention assembly of the present invention, wherein the collet assembly allows fast removal or installation of collets.
Figure 8:
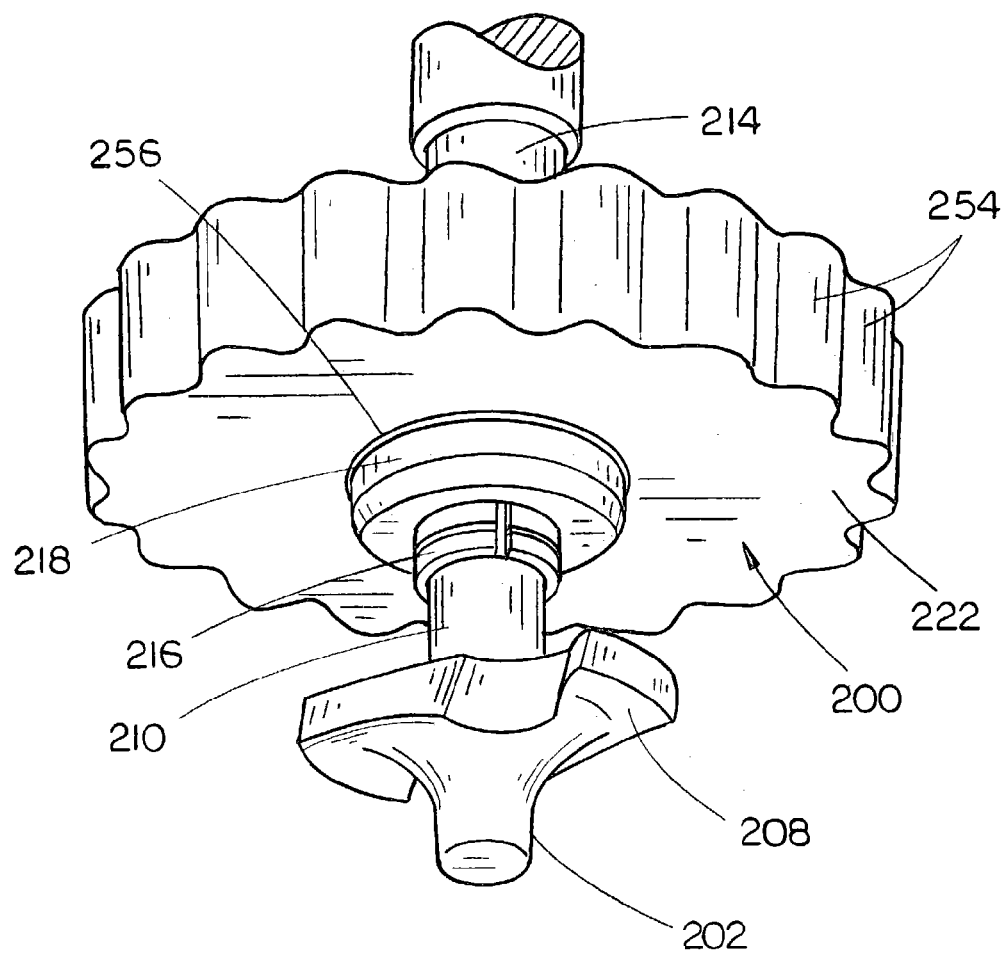
FIG. 8 is an isometric view illustrating a bit retention assembly in accordance with an exemplary embodiment of the present invention.

As shown in FIGS. 3 through 5, the gear teeth of the small planet gears 146 are enmeshed between the chuck gear teeth 136 and the ring gear teeth 148. Each large planet gear 144 is rotationally fixed to a respective small planet gear 146. The gear teeth of the large planet gears 144 are enmeshed with the output gear member teeth 128. Preferably, the planet gear assemblies 142 are rotationally connected to the first carrier 156 and the second carrier 158 via axle posts 166 so that the planet gear assemblies 142 rotate about the axle post 166 while orbiting within the ring gear 122 when the ring gear 122 is rotated by the user.

Figure 6:
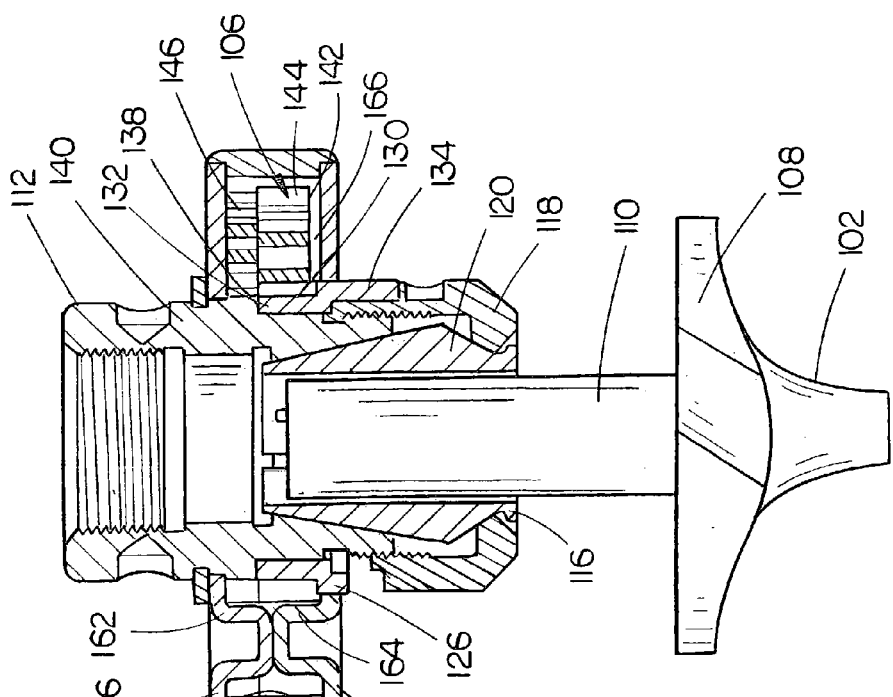
FIG. 6 is a cross-sectional side elevation view of the bit retention assembly shown in FIG. 1, wherein the bit retention assembly is opened for allowing insertion and removal of a bit.

The gear teeth of the large planet gears 144 rotate about their respective axle posts 166 while orbiting within the ring gear 122 as the ring gear 122 is rotated by the user. The small planet gear teeth 146 rotate and orbit along with the large planet gear teeth 144, causing the nut 118 to rotate in the same direction as the ring gear 122, though at a slower rate. In this manner, as illustrated in FIG. 5, the nut 118, which is threaded to the chuck 112, rotates and progresses down the chuck 112 when the ring gear 122 is rotated, compressing the collet 116 and causing the inside diameter of the collet 116 to close around the bit 102, securing the bit 102 within the collet 116. Alternately, as illustrated in FIG. 6, when the ring gear 122 is rotated in an opposing direction, the nut 118 also rotates in the opposing direction and progresses up the chuck 112 loosening the collet 116 and causing the inside diameter of the collet 116 to open, releasing the bit 102.

In the embodiment illustrated, planet gear assemblies 142 each comprise unitary components. However, those of ordinary skill in the art will appreciate that the large planet gear 144 and the small planet gear 146 may also comprise separate parts which are assembled together so as to be rotationally fixed with respect to one another without departing from the scope and spirit of the present invention. Preferably, the size and pitch of the large and small planet gears 144 and 146 is selected along with the respective diameters of the ring gear 122, chuck 112, and output gear member 126 and the gear teeth pitches of the output gear member teeth 128, chuck gear teeth 136 and ring gear teeth 148 are selected to provide the desired torque multiplication. For example, in exemplary embodiments of the bit retaining assembly 100, the large planet gear 144 has a diameter greater than the diameter of the small planet gear 146. Additionally, the pitch of the gear teeth of the large planet gear 144 is greater than the pitch of the gear teeth of the small planet gear 146. However, it will be appreciated by those of skill in the art that the present invention need not be limited to this configuration. For example, it is contemplated that large and small planet gears may be provided which have the same diameter but different gear teeth pitches, or different diameters and like gear teeth pitches without departing from the scope and spirit of the present invention.

The planetary design of the present invention is capable of providing a relatively large torque advantage since the torque applied to the nut 118 by hand-tightening the ring gear 122 may be multiplied many times over that which is typically applied by a user's hand. Those of ordinary skill in the art will appreciate that the torque magnification factor of the present invention may depend upon the size of the parts, pitch diameters chosen for the parts, and the like. In the case of a router, for example, parts may be chosen for enabling a person of ordinary physical strength to hand-tighten the nut 118 of the bit retaining system 100 for retaining the bit 102 in the collet 116. For instance, in one embodiment, a bit retaining assembly in accordance with the present invention can provide a torque multiplication or magnification of thirteen (13) times the torque that may be applied by hand. However, it is contemplated that depending on design requirements, bit retaining assemblies 100 in accordance with the present invention may provide larger or smaller torque magnifications. This may be desirable because the human hand is not typically capable of applying the needed torque for sufficiently tightening a nut with a standard nut/collet/chuck bit clamp without the use of hand tools, such as wrenches or the like, for providing additional mechanical advantage.

Referring to FIGS. 8 through 12, an exemplary bit retaining assembly 200 in accordance with the present invention is described. The bit retaining assembly 200 includes a chuck 212 for coupling the bit retaining assembly 200 to the rotor shaft 214 of the rotary tool (hand-held router 104, FIG. 1). A collet 216 is held within a generally conical depression formed in the chuck 212 for receiving the bit 202. A nut 218, threaded onto the chuck 212, alternately compresses the collet 216 to secure the bit 202 within the collet 216 and releases the collet allowing it to unclamp and release the bit 202 depending on the position of the nut 218 on the chuck 212. As shown, the collet 216, which has the general shape of a truncated cone, comprises a plurality of axial fingers 220 (four are illustrated) compressed by the chuck 212 about the bit 202. The planetary gear system 206 transmits torque applied to a housing member (i.e., sun gear 222) to the nut 218 for rotating the nut 218 on the chuck 212. The planetary gear system 206 multiplies the torque transmitted to the nut 218 so that the torque transmitted to the nut 218 is greater than the torque applied to the sun gear 222. In a preferred embodiment of the present invention, the hand-held router 104 includes a spring loaded locking pin 224 that engages a hole formed in the rotor shaft 214 and locks the rotor shaft 214 as the sun gear 222 is rotated by the user. The spring loaded locking pin 224 is depressed by the user, engaging the pin with the rotor shaft 214, to prevent rotation of the rotor shaft 214 while the sun gear 222 is rotated for tightening or loosening the nut 218, thereby clamping or releasing the bit 202 within the bit retaining assembly 200.

As shown in FIGS. 8 through 12, the collet 216 of the bit retaining assembly 200 is compressed between the chuck 212 and the nut 218. The nut 218 is threaded to the chuck 212 for compressing the collet 216 and retaining the bit 202. The chuck 212 is fixedly connected to a rotor shaft 214 (e.g., threaded onto the rotor shaft 214 (shown), held to the rotor shaft by a pin, etc.) for rotating the bit 202 retained by the collet 216. The nut 218 includes an annular tray portion 226 having nut gear teeth 228 circumferentially located about an inner edge 230 of its outer rim 232. The chuck 212 includes an annular portion 234 having chuck gear teeth 236 circumferentially located about an inner edge 238 of its outer rim 240, the outer rim 240 of the annular portion 234 being concentrically located about the outer rim 232 of the annular tray portion 226 so that the chuck gear teeth 236 are adjacent to the nut gear teeth 228.

Large and small planet gears 242 and 244 orbit the sun gear 222. The sun gear 222 includes sun gear teeth 246 circumferentially located about an outer edge 248 of its inner rim 250, the inner rim 250 of the sun gear 222 being concentrically located about the nut 218. Preferably, the outer surface 252 of the sun gear 222 is shaped to provide a gripping surface for rotating the sun gear 222. For example, in the embodiment illustrated in FIGS. 8 through 12, the outer surface 252 may include ridges 254 which allow the sun gear 222 to be more easily gripped by the user. In exemplary embodiments of the present invention, the sun gear 222 may be connected between the nut 218 and the annular tray portion 226 with a clip 256 or the like for retaining the sun gear 222. The annular tray portion 226 includes a bearing 258 or the like for supporting an annular ring 260 having large and small planet gears 242 and 244 positioned between the nut 218 and the sun gear 222.

Figure 9:
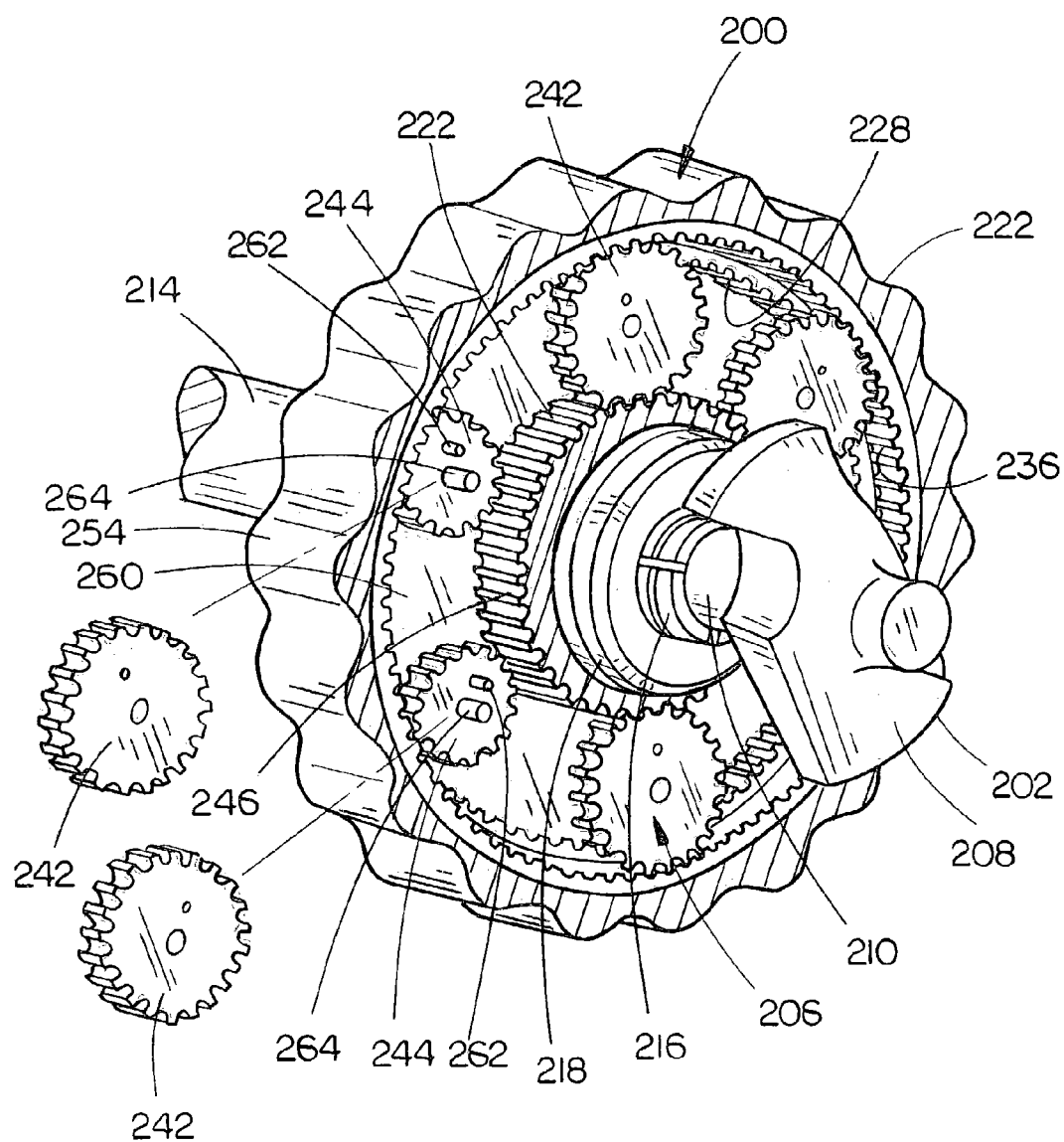
FIG. 9 is a partially exploded isometric view of the bit retention assembly shown in FIG. 8.
Figure 10:
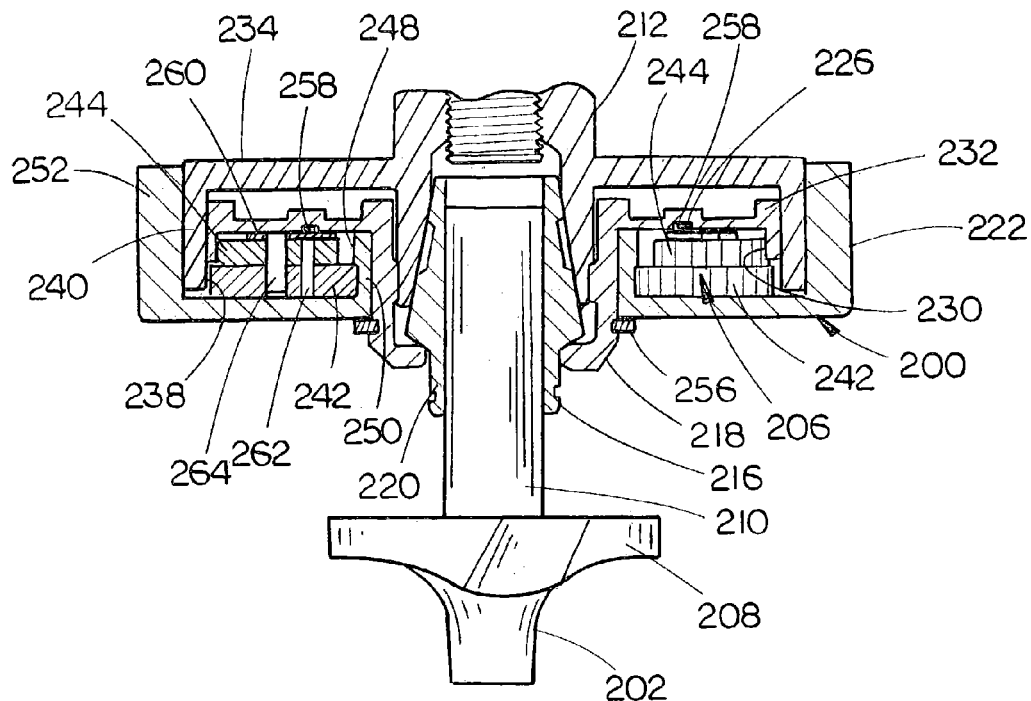
FIG. 10 is a cross-sectional side elevation view of the bit retention assembly shown in FIG. 8, wherein the bit retention assembly is closed for holding a bit.
Figure 11:
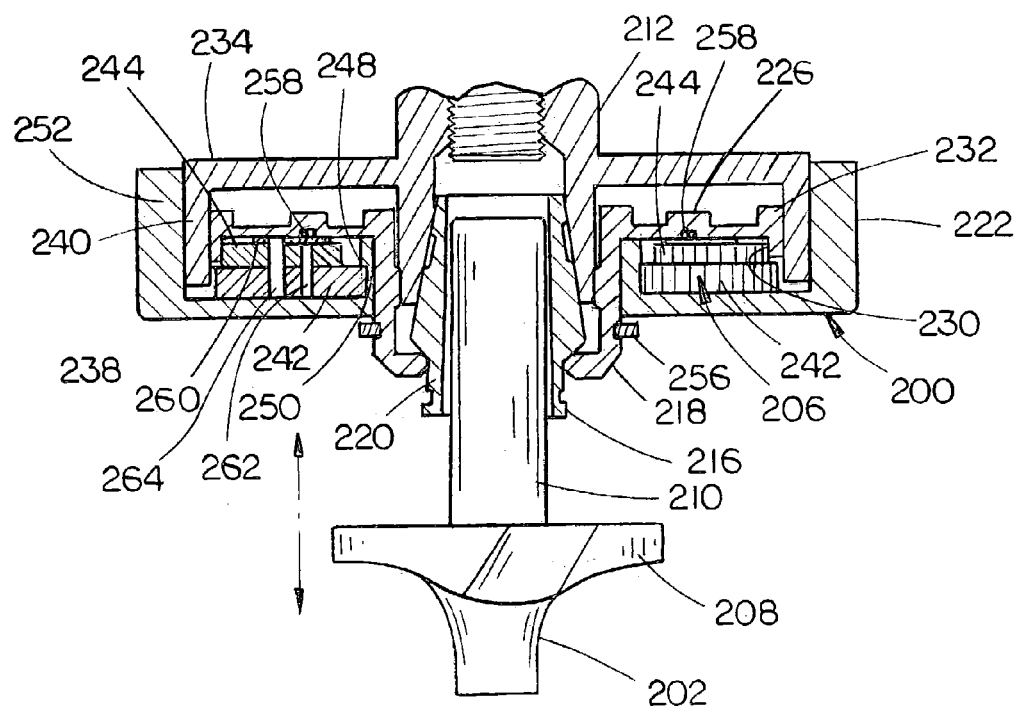
FIG. 11 is a cross-sectional side elevation view of the bit retention assembly shown in FIG. 8, wherein the bit retention assembly is opened for allowing insertion and removal of a bit.

As shown in FIGS. 9 through 11, the gear teeth of the large planet gear 242 are enmeshed between the chuck gear teeth 236 and the sun gear teeth 246. A small planet gear 244 is rotationally fixed to the large planet gear 242 with a pin 262 or the like, the gear teeth of the small planet gear 244 being enmeshed with the nut gear teeth 228. Preferably, the large planet gear 242 and the small planet gear 244 are rotationally connected to the annular ring 260 with an axle pin 264 or the like so that the large and small planet gears 242 and 244 rotate about the axle pin 264 while orbiting the sun gear 222 when the sun gear 222 is rotated by the user. Those of ordinary skill in the art will appreciate that the large planet gear 242 and the small planet gear 244 may also be included as an integral part or assembly without departing from the scope and spirit of the present invention.

The large planet gear 242 rotates about the axle pin 264 while orbiting the sun gear 222 when the sun gear 222 is rotated by the user. The small planet gear 244 rotates and orbits along with the large planet gear 242, causing the nut 218 to rotate in the same direction as the sun gear 222, though at a slower rate. In this manner, as illustrated in FIG. 10, the nut 218 which is threaded to the chuck 212 rotates and progresses down the chuck 212 when the sun gear 222 is rotated, compressing the collet 216 and causing the inside diameter of the collet 216 to close around the bit 202, securing the bit 202 within the collet 216 as illustrated in FIG. 4. Alternately, as illustrated in FIG. 11, when the sun gear 222 is rotated in an opposing direction, the nut 218 also rotates in the opposing direction and progresses up the chuck loosening the collet 216 and causing the inside diameter of the collet 216 to open, releasing the bit 202 as illustrated in FIG. 5.

In the embodiment illustrated in FIGS. 8 through 12, the large planet gear 242 and the small planet gear 244 comprise separate parts which are assembled together so as to be rotationally fixed with respect to one another. However, those of ordinary skill in the art will appreciate that the large planet gear 242 and the small planet gear 244 may also comprise a unitary component without departing from the scope and spirit of the present invention. Preferably, the size and pitch of the large and small planet gears 242 and 244 is selected along with the respective diameters of the sun gear 222, chuck 212, and nut 218 and the gear teeth pitches of the nut gear teeth 228, chuck gear teeth 236, and sun gear teeth 246 are selected to provide the desired torque multiplication. For example, in exemplary embodiments of the bit retaining assembly 200, the large planet gear 242 has a diameter greater than the diameter of the small planet gear 244. Additionally, the pitch of the gear teeth of the large planet gear 242 is greater than the pitch of the gear teeth of the small planet gear 244. However, it will be appreciated by those of skill in the art that the present invention need not be limited to this configuration. For example, it is contemplated that large and small planet gears may be provided which have the same diameter but different gear teeth pitches, or different diameters and like gear teeth pitches, without departing from the scope and spirit of the present invention.

Figure 12:
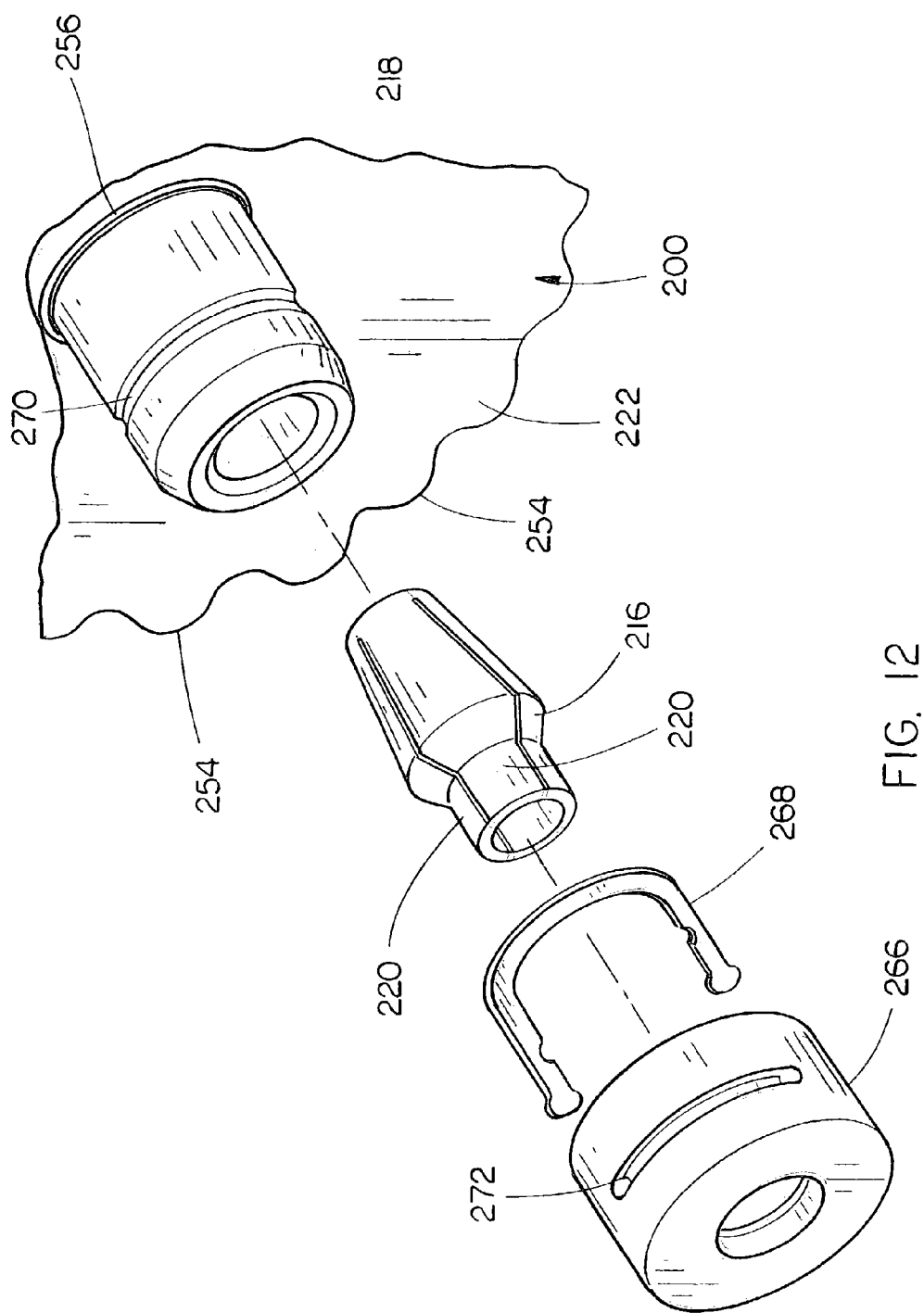
FIG. 12 is an isometric view illustrating a collet assembly suitable for use with the bit retention assembly of the present invention, wherein the collet assembly allows fast removal or installation of collets.

Referring now to FIG. 12, a bit retaining assembly 200 in accordance with a further exemplary embodiment of the present invention is described. The bit retaining assembly 200 includes a sleeve 266 for retaining the collet 216 disposed in the chuck 212 (FIGS. 4 and 5). The sleeve 266 is inserted onto an end of the nut 218 for compressing the collet 216 between the chuck 212 and the sleeve 266 attached to the nut 218. The sleeve 266 includes a spring loaded clip 268 for engaging an annular groove 270 circumferentially positioned around the nut 218. In exemplary embodiments of the present invention, the spring loaded clip 268 is seated in a slot 272 in the sleeve 266 and biased for engaging the nut 218. For instance, the spring loaded clip 268 may be biased with a compression spring or the like for engaging the annular groove 270 of the nut 218. The compression spring may bias the spring loaded clip 268 radially outward with respect to the sleeve 266 into a first position for engaging the annular groove 270. By pushing the spring loaded clip 268 radially inward with respect to the sleeve 266 into a second position and compressing the compression spring, the sleeve 266 may be removed from the nut 218, for replacing the collet 216. For example, the collet 216 may be replaced with a collet having a different diameter, shape, or the like for engaging a bit 202 with a shank 210 having a different diameter, shape, or the like.

It is believed that the tooless bit retaining system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A bit retaining assembly for retaining a bit in a rotary tool, the rotary tool having a rotor shaft for turning the bit, comprising:
   a chuck for coupling the bit retaining assembly to the rotor shaft;
   a collet disposed in the chuck for receiving the bit;
   a nut threaded onto the chuck for compressing the collet about the bit to secure the bit within the collet;
   a housing member for receiving application of a torque; and
   a planetary gear system for transmitting the torque applied to the housing member to the nut for rotating the nut on the chuck,
   wherein the planetary gear system multiplies the torque transmitted to the nut so that the torque transmitted to the nut is greater than the torque applied to the housing member.

2. The bit retaining assembly as claimed in claim 1, wherein the planetary gear system comprises a planet gear assembly for transmitting the torque between the housing member and the nut.

3. The bit retaining assembly as claimed in claim 2, where in the planet gear assembly comprises a large planet gear fixedly coupled to a small planet gear so that the large planet gear and the small planet gear are in axial alignment.

4. The bit retaining assembly as claimed in claim 2, further comprising a carrier for capturing the planet gear assembly.

5. The bit retaining assembly as claimed in claim 2, further comprising an output gear coupled to the nut for transmitting torque from the planet gear assembly to the nut.

6. The bit retaining assembly as claimed in claim 5, wherein the nut is nested in the output gear, the output gear including a projection engaging the nut for turning the nut.

7. The bit retaining assembly as claimed in claim 6, wherein the output gear disengages the nut when the nut is threaded off of the chuck allowing the nut and collet to be detached from the chuck for removal of the collet.

8. The bit retaining assembly as claimed in claim 3, wherein the housing member includes an outer surface suitable for being grasped by a user to rotate the housing member for application of the torque and a gear drive surface having a plurality of gear teeth for engaging the large planet gear so that rotation of the housing member rotates the large planet gear and the small planet gear.

9. The bit retaining assembly as claimed in claim 8, wherein the housing member comprises a ring gear.

10. The bit retaining assembly as claimed in claim 8, wherein the housing member comprises a sun gear.

11. The bit retaining assembly as claimed in claim 8, wherein the chuck comprises a plurality of gear teeth for engaging the large planet gear.

12. The bit retaining assembly as claimed in claim 1, wherein the planetary gear system comprises:
   a plurality of planet gear assemblies for transmitting the torque between the housing member and the nut, each of the planet gear assemblies including a large planet gear fixedly coupled to a small planet gear;
   first and second carriers coupled together for capturing the planet gear assemblies there between; and
   an output gear coupled to the nut for transmitting torque from the planet gear assemblies to the nut.

13. A bit retaining assembly for retaining a bit having a shank to the rotor shaft of a rotary tool, comprising:
   a chuck for being coupled to the rotor shaft of the rotary tool;
   a collet held by the chuck for receiving the shank;
   a nut threaded onto the chuck for clamping the collet about the shank;
   a planetary gear system for rotating the nut on the chuck; and
   a housing member turned by a user for driving the planetary gear system,
   wherein the planetary gear system rotates the nut on the chuck for clamping the collet about the shank to secure the shank within the bit retaining assembly when the housing member is rotated by the user.

14. The bit retaining assembly as claimed in claim 13, wherein the planetary gear system comprises a planet gear assembly for transmitting the torque between the housing member and the nut.

15. The bit retaining assembly as claimed in claim 14, wherein the planet gear assembly comprises a large planet gear fixedly coupled to a small planet gear so that the large planet gear and the small planet gear are in axial alignment.

16. The bit retaining assembly as claimed in claim 14, further comprising a carrier for capturing the planet gear assembly.

17. The bit retaining assembly as claimed in claim 14, further comprising an output gear coupled to the nut for transmitting torque from the planet gear assembly to the nut.

18. The bit retaining assembly as claimed in claim 17, wherein the nut is nested in the output gear, the output gear including a projection engaging the nut for turning the nut.

19. The bit retaining assembly as claimed in claim 18, wherein the output gear disengages the nut when the nut is threaded off of the chuck allowing the nut and collet to be detached from the chuck for removal of the collet.

20. The bit retaining assembly as claimed in claim 15, wherein the housing member includes an outer surface suitable for being grasped by a user to rotate the housing member for application of the torque and a gear drive surface having a plurality of gear teeth for engaging the large planet gear so that rotation of the housing member rotates the large planet gear and the small planet gear.

21. The bit retaining assembly as claimed in claim 20, wherein the housing member comprises a ring gear.

22. The bit retaining assembly as claimed in claim 20, wherein the housing member comprises a sun gear.

23. The bit retaining assembly as claimed in claim 20, wherein the chuck comprises a plurality of gear teeth for engaging the large planet gear.

24. The bit retaining assembly as claimed in claim 13, wherein the planetary gear system comprises:
a plurality of planet gear assemblies for transmitting the torque between the housing member and the nut, each of the planet gear assemblies including a large planet gear fixedly coupled to a small planet gear;
first and second carriers coupled together for capturing the planet gear assemblies there between; and
an output gear coupled to the nut for transmitting torque from the planet gear assemblies to the nut.

25. A rotary tool, comprising:
a rotor shaft for turning a bit;
a bit retaining assembly for retaining the bit, the bit retaining assembly including:
a chuck for coupling the bit retaining assembly to the rotor shaft;
a collet disposed in the chuck for receiving the bit;
a nut threaded onto the chuck for compressing the collet about the bit to secure the bit within the collet;
a housing member for receiving application of a torque; and
a planetary gear system for transmitting the torque applied to the housing member to the nut for rotating the nut on the chuck,
wherein the planetary gear system multiplies the torque transmitted to the nut so that the torque transmitted to the nut is greater than the torque applied to the housing member.

26. The rotary tool as claimed in claim 25, wherein the planetary gear system comprises a planet gear assembly for transmitting the torque between the housing member and the nut.

27. The rotary tool as claimed in claim 26, where in the planet gear assembly comprises a large planet gear fixedly coupled to a small planet gear so that the large planet gear and the small planet gear are in axial alignment.

28. The rotary tool as claimed in claim 26, further comprising a carrier for capturing the planet gear assembly.

29. The rotary tool as claimed in claim 26, further comprising an output gear coupled to the nut for transmitting torque from the planet gear assembly to the nut.

30. The rotary tool as claimed in claim 29, wherein the nut is nested in the output gear, the output gear including a projection engaging the nut for turning the nut.

31. The rotary tool as claimed in claim 30, wherein the output gear disengages the nut when the nut is threaded off of the chuck allowing the nut and collet to be detached from the chuck for removal of the collet.

32. The rotary tool as claimed in claim 27, wherein the housing member includes an outer surface suitable for being grasped by a user to rotate the housing member for application of the torque and a gear drive surface having a plurality of gear teeth for engaging the large planet gear so that rotation of the housing member rotates the large planet gear and the small planet gear.

33. The rotary tool as claimed in claim 32, wherein the housing member comprises a ring gear.

34. The rotary tool as claimed in claim 32, wherein the housing member comprises a sun gear.

35. The rotary tool as claimed in claim 32, wherein the chuck comprises a plurality of gear teeth for engaging the large planet gear.

36. The rotary tool as claimed in claim 25, wherein the planetary gear system comprises:
a plurality of planet gear assemblies for transmitting the torque between the housing member and the nut, each of the planet gear assemblies including a large planet gear fixedly coupled to a small planet gear;
first and second carriers coupled together for capturing the planet gear assemblies there between; and
an output gear coupled to the nut for transmitting torque from the planet gear assemblies to the nut.

37. A bit retaining assembly for retaining a bit in a router, the router having a rotor shaft for turning the bit, comprising:
a chuck for coupling the bit retaining assembly to the rotor shaft;
a collet disposed in the chuck for receiving the bit;
a nut threaded onto the chuck for compressing the collet about the bit to secure the bit within the collet;
a housing member for receiving application of a torque; and
a planetary gear system for transmitting the torque applied to the housing member to the nut for rotating the nut on the chuck,
wherein the planetary gear system multiplies the torque transmitted to the nut so that the torque transmitted to the nut is greater than the torque applied to the housing member.

38. The bit retaining assembly as claimed in claim 37, wherein the planetary gear system comprises a planet gear assembly for transmitting the torque between the housing member and the nut.

39. The bit retaining assembly as claimed in claim 38, where in the planet gear assembly comprises a large planet gear fixedly coupled to a small planet gear so that the large planet gear and the small planet gear are in axial alignment.

40. The bit retaining assembly as claimed in claim 38, further comprising a carrier for capturing the planet gear assembly.

41. The bit retaining assembly as claimed in claim 38, further comprising an output gear coupled to the nut for transmitting torque from the planet gear assembly to the nut.

42. The bit retaining assembly as claimed in claim 41, wherein the nut is nested in the output gear, the output gear including a projection engaging the nut for turning the nut.

43. The bit retaining assembly as claimed in claim 42, wherein the output gear disengages the nut when the nut is threaded off of the chuck allowing the nut and collet to be detached from the chuck for removal of the collet.

44. The bit retaining assembly as claimed in claim 39, wherein the housing member includes an outer surface suitable for being grasped by a user to rotate the housing member for application of the torque and a gear drive surface having a plurality of gear teeth for engaging the large planet gear so that rotation of the housing member rotates the large planet gear and the small planet gear.

45. The bit retaining assembly as claimed in claim 44, wherein the housing member comprises a ring gear.

46. The bit retaining assembly as claimed in claim 44, wherein the housing member comprises a sun gear.

47. The bit retaining assembly as claimed in claim 44, wherein the chuck comprises a plurality of gear teeth for engaging the large planet gear.

48. The bit retaining assembly as claimed in claim 37, wherein the planetary gear system comprises:

a plurality of planet gear assemblies for transmitting the torque between the housing member and the nut, each of the planet gear assemblies including a large planet gear fixedly coupled to a small planet gear;

first and second carriers coupled together for capturing the planet gear assemblies there between; and an output gear coupled to the nut for transmitting torque from the planet gear assemblies to the nut.

* * * * *